United States Patent
Ordouie et al.

(10) Patent No.: US 11,681,104 B1
(45) Date of Patent: Jun. 20, 2023

(54) PHOTONIC SWITCH WITH A CANTILEVER COUPLER

(71) Applicant: META PLATFORMS TECHNOLOGIES, LLC, Menlo Park, CA (US)

(72) Inventors: Ehsan Ordouie, Orlando, FL (US); Giuseppe Calafiore, Woodinville, WA (US); Zhimin Shi, Bellevue, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 17/739,421

(22) Filed: May 9, 2022

(51) Int. Cl.
*G02B 6/35* (2006.01)
*G02F 1/295* (2006.01)
*G02B 6/12* (2006.01)

(52) U.S. Cl.
CPC ......... *G02B 6/3502* (2013.01); *G02B 6/3566* (2013.01); *G02B 2006/1204* (2013.01); *G02F 1/295* (2013.01)

(58) Field of Classification Search
CPC .. G02B 6/3502; G02B 6/3504; G02B 6/3506; G02B 6/3508; G02B 6/3566; G02B 6/3578; G02B 2006/1204
See application file for complete search history.

(56) References Cited

U.S. PATENT DOCUMENTS

| | | | | |
|---|---|---|---|---|
| 5,796,886 A | * | 8/1998 | Hong | G02B 6/3502 385/21 |
| 10,823,913 B1 | * | 11/2020 | Moebius | G02B 6/355 |
| 2002/0039467 A1 | * | 4/2002 | Amantea | G02B 6/3536 385/16 |
| 2002/0181855 A1 | * | 12/2002 | Xue | G02B 6/12002 385/23 |
| 2004/0252730 A1 | * | 12/2004 | McCaughan | G02F 1/0305 372/6 |
| 2016/0327751 A1 | * | 11/2016 | Wu | G02B 6/355 |
| 2019/0170946 A1 | * | 6/2019 | Tu | G02B 6/35 |
| 2019/0253775 A1 | * | 8/2019 | Seok | H04J 14/02 |

OTHER PUBLICATIONS

Errando-Herranz C., et al., "MEMS for Photonic Integrated Circuits," IEEE Journal of Selected Topics in Quantum Electronics, Mar./Apr. 2020, vol. 26, No. 2, 16 pages.

(Continued)

*Primary Examiner* — Michael Stahl
(74) *Attorney, Agent, or Firm* — Artegis Law Group, LLP

(57) ABSTRACT

In some embodiments, a photonic switch includes a first layer, a cantilever coupler, and a set of electrodes. The first layer includes a first waveguide that directs light in a first direction and a second waveguide that directs light in a second direction that is different from the first direction. The cantilever coupler is formed from a lithium niobate material and disposed over the first layer. The cantilever coupler includes a first end that is positioned over the first waveguide and a second end that is bonded to the second waveguide. The set of electrodes apply an electric potential across the first end, which deforms the first waveguide to couple to the second waveguide and propagates light between the first waveguide and the second waveguide.

20 Claims, 8 Drawing Sheets

(56) References Cited

OTHER PUBLICATIONS

Han S., et al., "32×32 Silicon Photonic MEMS Switch with Gap-Adjustable Directional Couplers Fabricated in Commercial CMOS Foundry," Journal of Optical Microsystems, Mar. 24, 2021, vol. 1, No. 2, 9 pages.

Han S., et al., "Large-Scale Silicon Photonic Switches with Movable Directional Couplers," Optica, Apr. 2015, vol. 2, No. 4, pp. 370-375.

Quack N., et al., "MEMS-Enabled Silicon Photonic Integrated Devices and Circuits," IEEE Journal of Quantum Electronics, Feb. 2020, vol. 56, No. 1, 10 pages.

Seok T.J., et al., "Large-Scale Broadband Digital Silicon Photonic Switches with Vertical Adiabatic Couplers," Optica, Jan. 2016, vol. 3, No. 1, pp. 64-70.

Seok T.J., et al., "Wafer-Scale Silicon Photonic Switches Beyond Die Size Limit," Optica, Apr. 2019, vol. 6, No. 4, pp. 490-494.

\* cited by examiner

PHOTONIC SWITCH WITH A CANTILEVER COUPLER

BACKGROUND

Field of the Various Embodiments

Embodiments of the present disclosure relate generally to photonic integrated circuits and, more specifically, to a photonic switch with a cantilever coupler.

Description of the Related Art

Integrated photonics technology involves the use of light in applications that traditionally involve electronics. Integrated photonics products include photonic integrated circuits that emit, transmit, process, modulate, sense, or route optical signals. Within a photonic integrated circuit, photons pass through optical components such as waveguides, lasers, polarizers, and phase shifters. Like the components of electronic integrated circuits, these optical components can be integrated and fabricated on various types of substrates or layers. Because a photonic integrated circuit operates using light, integrated photonic technology can be higher speed, greater bandwidth, lower temperature, and lower power than electronic integrated circuits, which operate via the transmission of electrons that generate heat and slow down over time.

Integrated photonics technology can be used to create photonic switches that direct incoming light to various outputs. For example, a photonic switch could be used to toggle between an "off" state that blocks incoming light from an input port from reaching an output port and an "on" state that allows incoming light from the input port to reach the output port. Multiple photonic switches could be fabricated on a single integrated switch circuit to route signals across various links and endpoints within a data center, head-mounted display, biomedical device, sensor device, and/or other types of optical systems or components.

Some integrated photonic switches are implemented using microelectromechanical systems (MEMS) technology that include microscopic moving parts. For example, a photonic switch could include MEMS elements that use electrostatic actuation to toggle switching elements between the "on" and "off" states.

These MEMS-based photonic switches reduce optical insertion loss, crosstalk, and other costs associated with other types of photonic switches.

However, MEMS-based photonic switches still suffer from a number of drawbacks. First, MEMS-based photonic switches use silicon to perform actuation and direct light. Because silicon is very lossy for light in the visible range, MEMS-based photonic switches are not suitable in augmented reality, virtual reality, and other applications involving the transmission of visible light. Second, MEMS-based photonic switches include complicated designs and structures to support electrostatic actuation or movable components within the photonic switches. As a result, MEMS-based photonic switches can be more difficult and costly to design and fabricate than other types of photonic switches.

As the foregoing illustrates, what is needed in the art are more effective techniques for designing and implementing photonic switches.

SUMMARY

In some embodiments, a photonic switch includes a first layer, a cantilever coupler, and a set of electrodes. The first layer includes a first waveguide that directs light in a first direction and a second waveguide that directs light in a second direction that is different from the first direction. The cantilever coupler is formed from a lithium niobate material and disposed over the first layer. The cantilever coupler includes a first end that is positioned over the first waveguide and a second end that is bonded to the second waveguide. The set of electrodes apply an electric potential across the first end, which deforms the first waveguide to couple to the second waveguide and propagates light between the first waveguide and the second waveguide.

One technical advantage of the disclosed techniques relative to the prior art is the use of a lithium niobate material with a wide transmission window to transmit light. Accordingly, the disclosed techniques can be used to transmit and route light in both visible and communication wavelengths, unlike conventional photonic switches that utilize silicon-based materials that are lossy in visible wavelengths. Another technical advantage of the disclosed techniques is the use of relatively simple structures to support the movable part of the photonic switch. Consequently, the disclosed techniques allow photonic switches to be fabricated more easily and efficiently than conventional approaches that involve complicated designs and fabrication methods. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
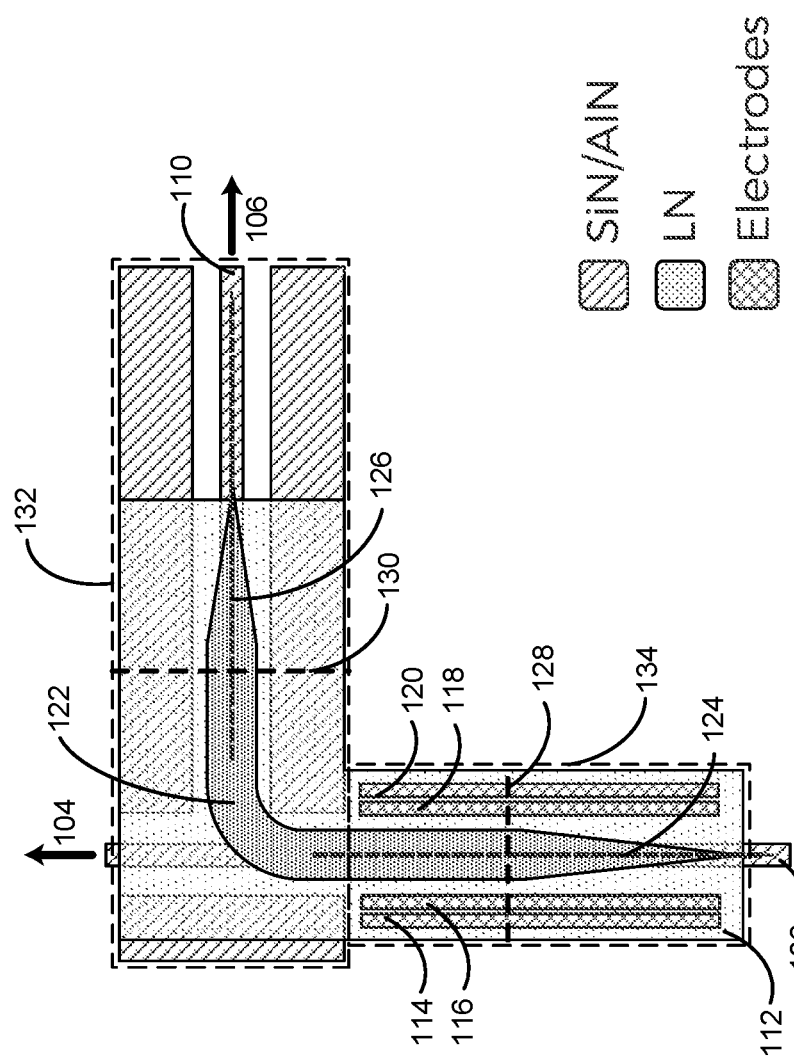
FIG. 1 illustrates a photonic switch, according to one or more aspects of various embodiments.

In the following description, numerous specific details are set forth to provide a more thorough understanding of the various embodiments. However, it will be apparent to one of skill in the art that the inventive concepts may be practiced without one or more of these specific details.

Overview

As discussed above, MEMS-based photonic switches use electrostatic actuation to toggle switching elements between an "on" state that allows incoming light from an input port to reach an output port and an "off" state that prevents incoming light from the input port from reaching the output port. However, MEMS-based photonic switches use silicon to perform actuation and direct light, which interferes with the use of MEMS-based photonic switches in applications involving visible light. Further, MEMS-based photonic switches include complex structures that support electrostatic actuation and movable components, which increases the overhead associated with designing and fabricating these types of photonic switches.

To address these issues, the disclosed embodiments include a photonic switch with a cantilever coupler that is electrostatically actuated. The cantilever coupler includes a lithium niobate material with a wide transmission window that allows for efficient transmission of light in both visible and communication wavelengths. Below the cantilever coupler, the photonic switch includes a lower layer with two waveguides that direct light in two different directions. This lower layer can be formed from silicon nitride, aluminum nitride, or another material that propagates visible light. A first end of the cantilever coupler is positioned over a first waveguide in the lower layer without being bonded or physically attached to the first waveguide, and a second end of the cantilever coupler is bonded to a second waveguide in the lower layer.

During operation of the photonic switch, a set of electrodes is used to apply an electric potential across the first end of the cantilever coupler, thereby deforming the first end of the cantilever coupler downward toward the first waveguide in the lower layer. This deformation couples the first end of the cantilever coupler to the first waveguide in the lower layer and allows incoming light from the first waveguide to be routed to the second waveguide via one or more waveguides in the cantilever coupler. This application of electric potential across the first end of the cantilever coupler thus causes the photonic switch to be placed in an "on" state that propagates light from an input port coupled to the first waveguide to an output port coupled to the second waveguide. Conversely, a lack of electric potential across the first end of the cantilever coupler prevents the first end of the cantilever coupler from coupling with the first waveguide in the lower layer. The lack of electric potential across the first end of the cantilever coupler therefore causes the photonic switch to be placed in an "off" state that blocks the transmission of light from the input port coupled to the first waveguide to the output port coupled to the second waveguide.

Photonic Switch with a Cantilever Coupler

FIG. 1 illustrates a photonic switch, according to one or more aspects of various embodiments. As shown in FIG. 1, the photonic switch includes a first layer a material that transmits visible light. This first layer includes two waveguides 108 and 110 that direct light in different directions. Waveguides 108 and 110 can be etched, deposited, or otherwise formed within the first layer. Further, while waveguides 108 and 110 are shown as orthogonal to one another in FIG. 1, it will be appreciated that waveguides 108 and 110 can be arranged or positioned in other ways.

The photonic switch also includes a second layer of lithium niobate (LN) and/or another piezoelectric material that is disposed over the first layer. This second layer includes a cantilever coupler 122 that is formed above a thinner portion 112 of the same material. For example, a thicker layer of LN could be etched to form cantilever coupler 122 above portion 112.

In some embodiments, the first layer under cantilever coupler 122 includes a material with low loss at the operating wavelength of the photonic switch, a lower refractive index than the material used in cantilever coupler 122, and/or electrical insulation properties. For example, the first layer could be composed of silicon nitride (SiN), aluminum nitride (AlN), or another type of cladding material or "static waveguide" material. The first layer could also, or instead, include a multi-layer structure, a nano-composite material, and/or a gradient-index material.

In one or more embodiments, the photonic switch includes a stationary section 132 that does not have any movable components. Within section 132, the second layer of LN that includes one end of cantilever coupler 122 and the thinner portion 112 is bonded or otherwise affixed to waveguide 110 and other portions of the first layer. Section 132 is described below in further detail with respect to a first cross section 126 illustrated in FIG. 3 and a second cross section 130 illustrated in FIG. 5.

The photonic switch also includes a non-stationary section 134 that includes movable components. More specifically, section 134 includes a "non-bonded" end of cantilever coupler 122 that corresponds to a projecting "beam" portion of a cantilever structure. This non-bonded end of cantilever coupler 122 is connected to and physically supported by the end of cantilever coupler 122 that is bonded to waveguide 110 inside section 132, thereby allowing this non-bonded end of cantilever coupler 122 to "hover" over waveguide 108 without physically contacting waveguide 108 within section 134. Section 134 is described blow in further detail with respect to a first cross section 124 illustrated in FIG. 2 and a second cross section 128 illustrated in FIG. 4.

In some embodiments, the photonic switch is operated via electrostatic actuation of cantilever coupler 122. As shown in FIG. 1, a number of electrodes 114-120 (e.g., two ground electrodes 114 and 118 and two signal electrodes 116 and 120) are used to selectively apply an electric potential across the non-bonded end of cantilever coupler 122 that resides in section 134. When the electric potential is applied by electrodes 114-120, the non-bonded end is displaced downward toward waveguide 108. The downward displacement of the non-bonded end is combined with adiabatic tapering in both ends of cantilever coupler 122 to provide coupling that allows light to transition smoothly from waveguide 108 to the downward displaced end of cantilever coupler 122, along a waveguide in cantilever coupler 122, and from the waveguide in cantilever coupler 122 to waveguide 110. Consequently, the application of voltage via electrodes 114-120 causes the photonic switch to be placed in an "on" state that routes incoming light received from an input port 102 that is coupled to waveguide 108 to an output port 106 that is coupled to waveguide 110.

When voltage is not applied across the non-bonded end of cantilever coupler 122 that resides in section 134, the non-bonded end of cantilever coupler 122 within section 134 is separated from waveguide 108 by a vertical gap that prevents coupling of this end of cantilever coupler 122 to waveguide 108. As a result, incoming light from port 102 continues to be propagated along waveguide 108 until the light exits the photonic switch at a through port 104 coupled to the other end of waveguide 108. In other words, the lack of electric potential across the non-bonded end of cantilever coupler 122 in section 134 places the photonic switch in an "off" state that blocks incoming light from port 102 from reaching the output port 106.

Figure 2:
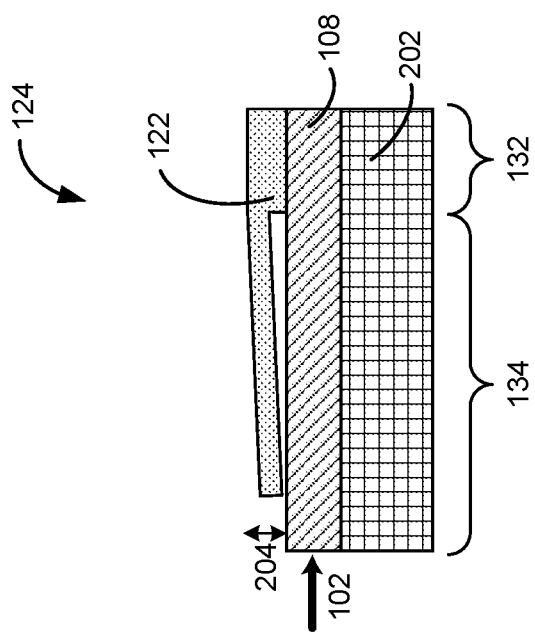
FIG. 2 illustrates a cross section of the photonic switch of FIG. 1, according to various embodiments.

FIG. 2 illustrates cross section 124 of the photonic switch of FIG. 1, according to various embodiments. As shown in FIG. 2, a portion of cross section 124 resides within the non-stationary section 134 of the photonic switch, and a smaller portion of cross section 124 resides within the stationary section 132 of the photonic switch.

Within the portion of cross section 124 that resides in section 132, cantilever coupler 122 is bonded to waveguide 108, and waveguide 108 is disposed over a buried oxide (BOX) layer 202. For example, layer 202 could include a substrate of SiN; waveguide 108 could include a layer of SiN, AlN, or another cladding material that is formed on layer 202; and cantilever coupler 122 could include a thin-film LN that is bonded to waveguide 108.

Within the portion of cross section 124 that resides in section 134, the non-bonded end of cantilever coupler 122 is supported by the portion of cantilever coupler 122 residing within section 132. As a result, the non-bonded end of cantilever coupler 122 inside section 134 is positioned over waveguide 108 without being physically bonded or attached to waveguide 108. This non-bonded end of cantilever coupler 122 additionally experiences a vertical out-of-plane displacement 204 in response to an electric potential. For example, the non-bonded end of cantilever coupler 122 could be substantially parallel to waveguide 108 and separated from waveguide 108 by a vertical gap when an electric potential is not applied across the second end of cantilever coupler 122. Conversely, the non-bonded end of cantilever coupler 122 that resides in section 134 could be displaced downward toward waveguide 108 when an electric potential is applied across this end of cantilever coupler 122. This downward displacement causes coupling of the non-bonded end of cantilever coupler 122 to waveguide 108, thereby allowing light from port 102 to be propagated from waveguide 108 to a waveguide (not shown) in cantilever coupler 122.

In some embodiments, the downward displacement of the non-bonded end of cantilever coupler 122 within section 134 is produced via selection of a crystal orientation of thin-film LN that results in a certain vertical out-of-plane deformation in the presence of an electric field. The vertical out-of-plane deformation and/or the vertical gap between the non-bonded end of cantilever coupler 122 and waveguide 108 when the non-bonded end is not deformed can additionally be adjusted to support coupling of specific wavelengths of light with which the photonic switch is to be used.

Figure 3:
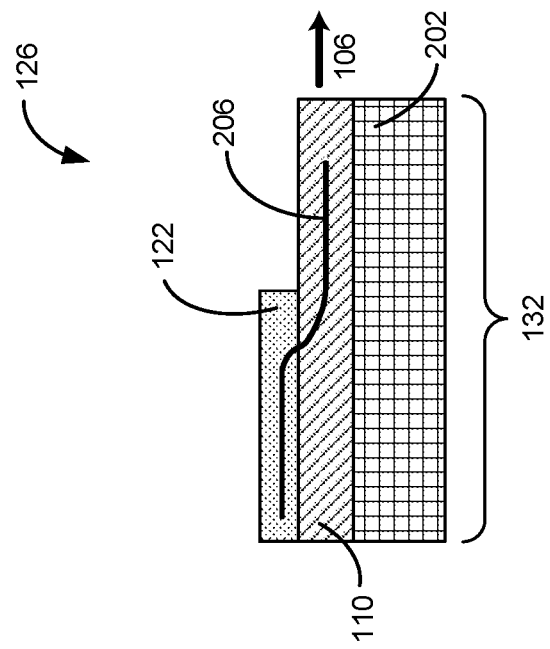
FIG. 3 illustrates a cross section of the photonic switch of FIG. 1, according to various embodiments.

FIG. 3 illustrates cross section 126 of the photonic switch of FIG. 1, according to various embodiments. As shown in FIG. 3, the entirety of cross section 126 lies within the stationary section 132 of the photonic switch. Within cross section 126, another end of cantilever coupler 122 is bonded to waveguide 110, and waveguide 110 is disposed over the BOX layer 202. For example, layer 202 could include a substrate of SiN; waveguide 110 could include a layer of SiN, AlN, or another cladding material that is formed on layer 202; and cantilever coupler 122 could include a thin-film LN that is bonded to waveguide 110.

Cross section 126 also includes a path 206 taken by light as the light approaches port 106. More specifically, path 206 begins in a waveguide within the end of cantilever coupler 122 that is bonded to waveguide 110 and ends in waveguide 110. Path 206 is a result of adiabatic coupling of this end of cantilever coupler 122 to waveguide 110. This adiabatic coupling is similar to the adiabatic coupling of the non-bonded end of cantilever coupler 122 to waveguide 108 when the non-bonded end of cantilever coupler 122 is displaced downward.

Figure 4:
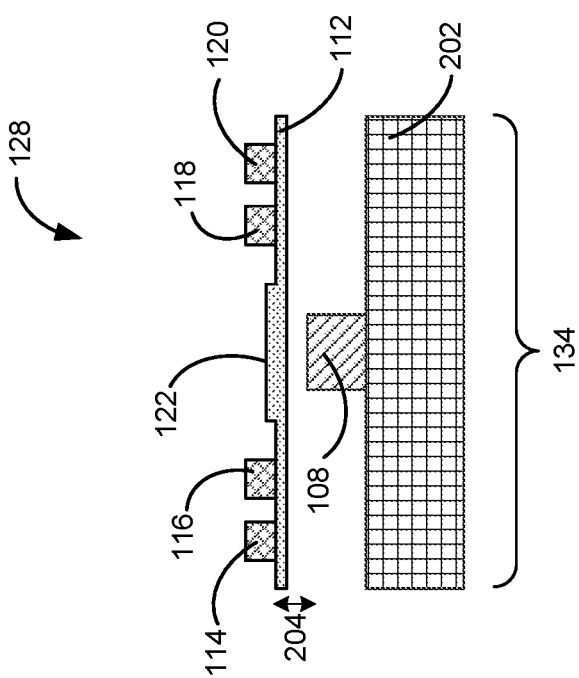
FIG. 4 illustrates a cross section of the photonic switch of FIG. 1, according to various embodiments.

FIG. 4 illustrates cross section 128 of the photonic switch of FIG. 1, according to various embodiments. As shown in FIG. 4, the entirety of cross section 128 lies within the non-stationary section 134 of the photonic switch. Within cross section 128, waveguide 108 is disposed over the BOX layer 202, and the layer of LN that includes portion 112 and cantilever coupler 122 is positioned over waveguide 108 without physically contacting waveguide 108. Electrodes 114-120 are additionally disposed over the top of portion 112.

More specifically, cantilever coupler 122 includes a thicker layer of LN than portion 112 to accommodate a waveguide. As described above, the non-bonded end of cantilever coupler 122 that resides within section 134 also experiences a vertical displacement 204 in response to an electric potential that is applied via electrodes 114-120. This vertical displacement causes cantilever coupler 122 to couple to waveguide 108 and allows light to be propagated from waveguide 108 to the waveguide in cantilever coupler 122.

Figure 5:
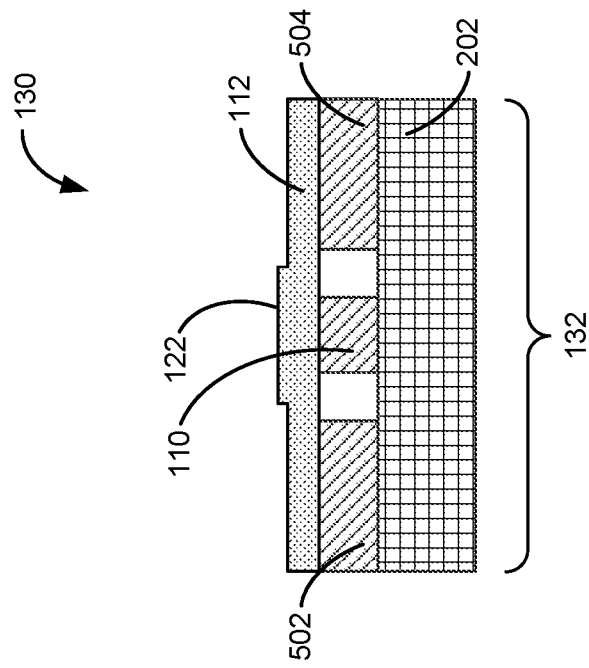
FIG. 5 illustrates a cross section of the photonic switch of FIG. 1, according to various embodiments.

FIG. 5 illustrates cross section 130 of the photonic switch of FIG. 1, according to various embodiments. As shown in FIG. 5, the entirety of cross section 130 lies within the stationary section 132 of the photonic switch. Within cross section 128, waveguide 110 is physically separated from two other portions 502-504 of the same layer of material (e.g., SiN, AlN, or another cladding material) by two gaps. For example, waveguide 110 and portions 502-504 could be formed from the layer of material by etching the gaps into the layer.

Waveguide 110 and portions 502-504 are additionally disposed between the BOX layer 202 and the LN layer that includes portion 112 and cantilever coupler 122. For example, waveguide 110 and portions 502-504 could be bonded to both layer 202 and portion 112. This bonding allows light to be propagated from a waveguide in cantilever coupler 122 to waveguide 110 and subsequently to the output port 106, as discussed above.

Figure 6:
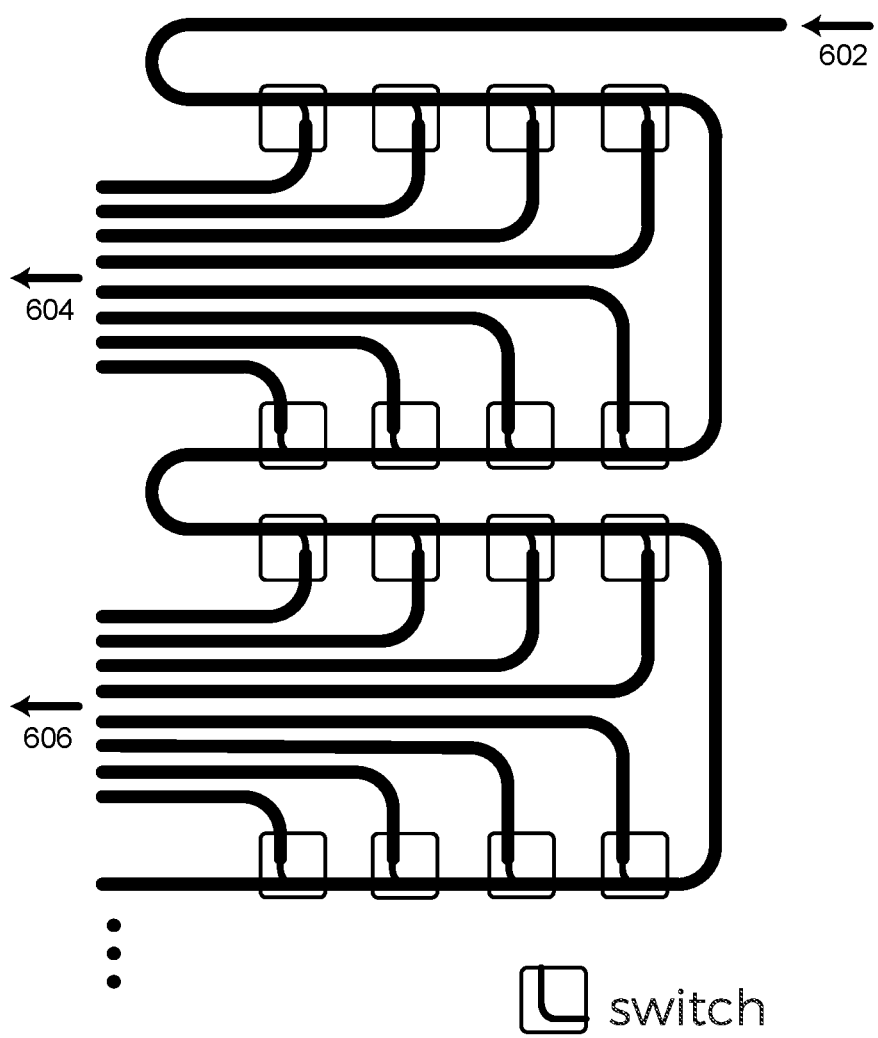
FIG. 6 illustrates a network of photonic switches, according to various embodiments.

FIG. 6 illustrates a network of photonic switches, according to various embodiments. The network can be fabricated on a single photonic integrated circuit and/or across multiple photonic integrated circuits. The network includes a single input port 602 and multiple output ports 604-606. The network also includes multiple photonic switches that are coupled to the input port 602. Each photonic switch is additionally coupled to a different output port.

The configuration of photonic switches and ports 602-606 allows incoming light from port 602 to be routed to any number and combination of outputs. For example, a single photonic switch could be placed in the "on" state at a given time to route light from port 602 to the corresponding output port. In another example, multiple photonic switches could be placed in the "on" state to route light from port 602 to more than one output.

The network of FIG. 6 provides a number of advantages over conventional photonic switch networks. First, the routing of light from port 602 to a given output port by a single switch reduces on-chip insertion loss, compared with switch networks that accumulate losses over multiple stages of switches. Second, the ability to fit large numbers of photonic switches on the same integrated circuit improves the integration density of the integrated circuit. Third, the independent powering of individual photonic switches in the network reduces power consumption over switch networks that operate by powering multiple switches at a given time.

Figure 7:
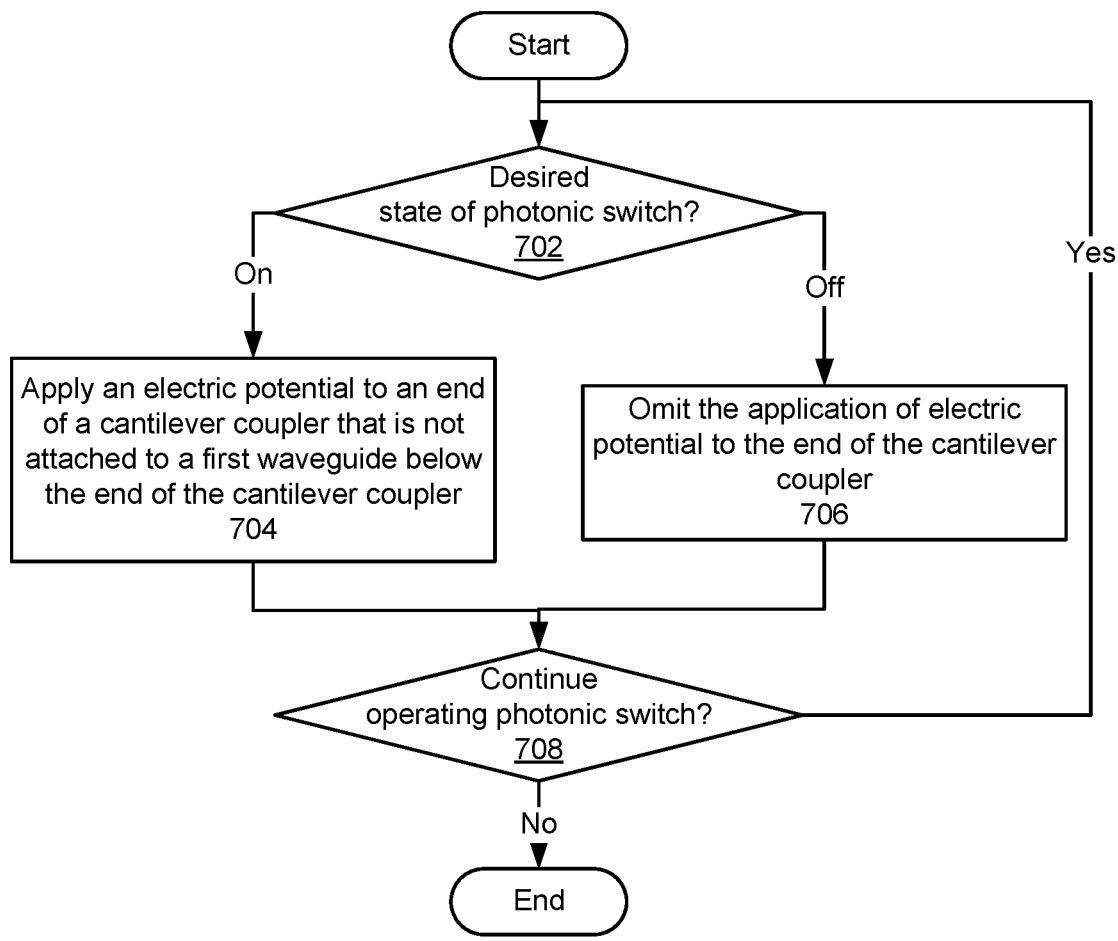
FIG. 7 sets forth a flow diagram of method steps for operating a photonic switch, according to various embodiments.

FIG. 7 sets forth a flow diagram of method steps for operating a photonic switch, according to various embodiments. Although the method steps are described in conjunction with the systems of FIGS. 1-6, persons skilled in the art will understand that any system configured to perform the method steps in any order falls within the scope of the present disclosure.

As shown, in step 702, the desired state of the photonic switch is determined. For example, a controller (not shown) that is coupled to the photonic switch could be used to set the desired state of the photonic switch to "on" or "off."

If the desired state is determined to be "on," step 704 is performed via electrodes 114-120 to apply an electric potential to an end of cantilever coupler 122 that is not bonded to a first waveguide 108 below the end of cantilever coupler 122. The applied electric potential causes this end of cantilever coupler 122 to deform and couple to the first waveguide 108, thereby allowing light to propagate from the first waveguide 108 through cantilever coupler 122 to a second waveguide 110 in the photonic switch.

If the desired state is determined to be "off," step 706 is performed via electrodes 114-120 to omit (or discontinue) the application of electric potential to the end of cantilever coupler 122. This absence of electric potential across the end of cantilever coupler 122 prevents the non-bonded end of cantilever coupler 122 from deforming and coupling to waveguide 108. As a result, cantilever coupler 122 does not propagate light from waveguide 108 to the other waveguide 110.

In step 708, a determination as to whether or not to continue operating the photonic switch is made. For example, the controller could be used to operate the photonic switch while the photonic switch is used to selectively route or block light between an input port coupled to waveguide 108 and an output port coupled to waveguide 110. While the photonic switch continues to be operated, steps 702-706 are repeated to toggle the photonic switch between the "on" and "off" states.

Artificial Reality System

Embodiments of the disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) or near-eye display (NED) connected to a host computer system, a standalone HMD or NED, a mobile device or computing system, or any other hardware platform capable of providing artificial reality content to one or more viewers.

Figure 8:
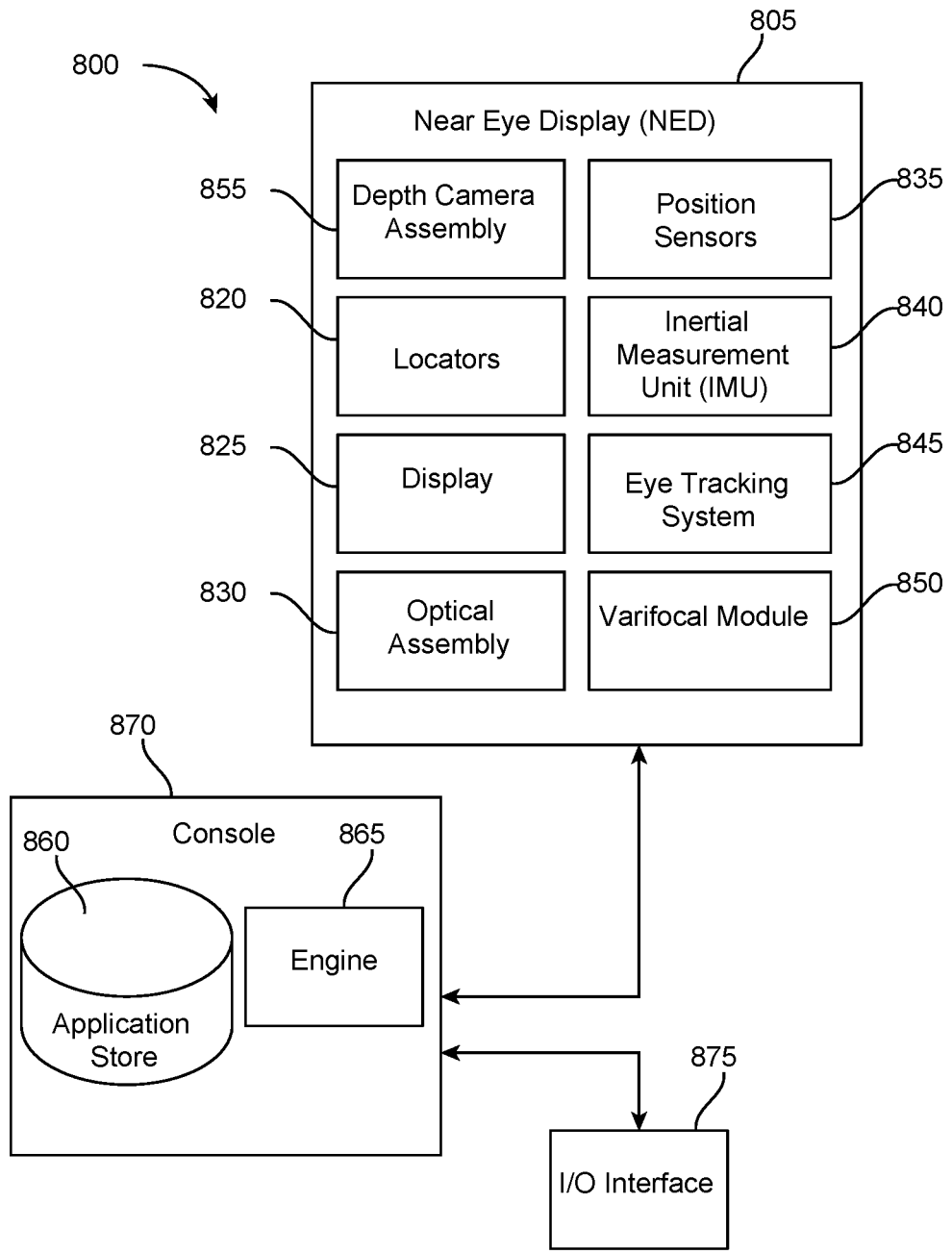
FIG. 8 is a block diagram of an embodiment of a near-eye display (NED) system in which a console operates, according to various embodiments.

FIG. 8 is a block diagram of an embodiment of a near-eye display (NED) system 800 in which a console operates, according to various embodiments. The NED system 800 may operate in a virtual reality (VR) system environment, an augmented reality (AR) system environment, a mixed reality (MR) system environment, or some combination thereof. The NED system 800 shown in FIG. 8 comprises a NED 805 and an input/output (I/O) interface 875 that is coupled to the console 870. In various embodiments, the composite display system 800 is included in or operates in conjunction with the NED system 800. For example, the composite display system 800 may be included within NED 805 or may be coupled to the console 870 and/or the NED 805.

While FIG. 8 shows an example NED system 800 including one NED 805 and one I/O interface 875, in other embodiments any number of these components may be included in the NED system 800. For example, there may be multiple NEDs 805, and each NED 805 has an associated I/O interface 875. Each NED 805 and I/O interface 875 communicates with the console 870. In alternative configurations, different and/or additional components may be included in the NED system 800. Additionally, various components included within the NED 805, the console 870, and the I/O interface 875 may be distributed in a different manner than is described in conjunction with FIGS. 1-3B in some embodiments. For example, some or all of the functionality of the console 870 may be provided by the NED 805 and vice versa.

The NED 805 may be a head-mounted display that presents content to a user. The content may include virtual and/or augmented views of a physical, real-world environment including computer-generated elements (e.g., two-dimensional or three-dimensional images, two-dimensional or three-dimensional video, sound, etc.). In some embodiments, the NED 805 may also present audio content to a user. The NED 805 and/or the console 870 may transmit the audio content to an external device via the I/O interface 875. The external device may include various forms of speaker systems and/or headphones. In various embodiments, the audio content is synchronized with visual content being displayed by the NED 805.

The NED 805 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other.

As shown in FIG. 8, the NED 805 may include a depth camera assembly (DCA) 855, one or more locators 820, a display 825, an optical assembly 830, one or more position sensors 835, an inertial measurement unit (IMU) 840, an eye tracking system 845, and a varifocal module 850. In some embodiments, the display 825 and the optical assembly 830 can be integrated together into a projection assembly. Various embodiments of the NED 805 may have additional, fewer, or different components than those listed above. Additionally, the functionality of each component may be partially or completely encompassed by the functionality of one or more other components in various embodiments.

The DCA 855 captures sensor data describing depth information of an area surrounding the NED 805. The sensor data may be generated by one or a combination of depth imaging techniques, such as triangulation, structured light imaging, time-of-flight imaging, stereo imaging, laser scan, and so forth. The DCA 855 can compute various depth properties of the area surrounding the NED 805 using the sensor data. Additionally or alternatively, the DCA 855 may transmit the sensor data to the console 870 for processing. Further, in various embodiments, the DCA 855 captures or samples sensor data at different times. For example, the DCA 855 could sample sensor data at different times within a time window to obtain sensor data along a time dimension.

The DCA 855 includes an illumination source, an imaging device, and a controller. The illumination source emits light onto an area surrounding the NED 805. In an embodiment, the emitted light is structured light. The illumination source includes a plurality of emitters that each emits light having certain characteristics (e.g., wavelength, polarization, coherence, temporal behavior, etc.). The characteristics may be the same or different between emitters, and the emitters can be operated simultaneously or individually. In one embodiment, the plurality of emitters could be, e.g., laser diodes (such as edge emitters), inorganic or organic light-emitting diodes (LEDs), a vertical-cavity surface-emitting laser (VCSEL), or some other source. In some embodiments, a single emitter or a plurality of emitters in the illumination source can emit light having a structured light pattern. The imaging device captures ambient light in the environment surrounding NED 805, in addition to light reflected off of objects in the environment that is generated by the plurality of emitters. In various embodiments, the imaging device may be an infrared camera or a camera configured to operate in a visible spectrum. The controller coordinates how the illumination source emits light and how the imaging device captures light. For example, the controller may determine a brightness of the emitted light. In some embodiments, the controller also analyzes detected light to detect objects in the environment and position information related to those objects.

The locators 820 are objects located in specific positions on the NED 805 relative to one another and relative to a specific reference point on the NED 805. A locator 820 may be a light emitting diode (LED), a corner cube reflector, a reflective marker, a type of light source that contrasts with an environment in which the NED 805 operates, or some combination thereof. In embodiments where the locators 820 are active (i.e., an LED or other type of light emitting device), the locators 820 may emit light in the visible band (~380 nm to 950 nm), in the infrared (IR) band (~950 nm to 9700 nm), in the ultraviolet band (70 nm to 380 nm), some other portion of the electromagnetic spectrum, or some combination thereof.

In some embodiments, the locators 820 are located beneath an outer surface of the NED 805, which is transparent to the wavelengths of light emitted or reflected by the locators 820 or is thin enough not to substantially attenuate the wavelengths of light emitted or reflected by the locators 820. Additionally, in some embodiments, the outer surface or other portions of the NED 805 are opaque in the visible band of wavelengths of light. Thus, the locators 820 may emit light in the IR band under an outer surface that is transparent in the IR band but opaque in the visible band.

The display 825 displays two-dimensional or three-dimensional images to the user in accordance with pixel data received from the console 870 and/or one or more other sources. In various embodiments, the display 825 comprises a single display or multiple displays (e.g., separate displays for each eye of a user). In some embodiments, the display 825 comprises a single or multiple waveguide displays. Light can be coupled into the single or multiple waveguide displays via, e.g., a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, a laser-based display, one or more waveguides, other types of displays, a scanner, a one-dimensional array, and so forth. In addition, combinations of the display types may be incorporated in display 825 and used separately, in parallel, and/or in combination.

The optical assembly 830 magnifies image light received from the display 825, corrects optical errors associated with the image light, and presents the corrected image light to a user of the NED 805. The optical assembly 830 includes a plurality of optical elements. For example, one or more of the following optical elements may be included in the optical assembly 830: an aperture, a Fresnel lens, a convex lens, a concave lens, a filter, a reflecting surface, or any other suitable optical element that deflects, reflects, refracts, and/or in some way alters image light. Moreover, the optical assembly 830 may include combinations of different optical elements. In some embodiments, one or more of the optical elements in the optical assembly 830 may have one or more coatings, such as partially reflective or antireflective coatings.

In some embodiments, the optical assembly 830 may be designed to correct one or more types of optical errors. Examples of optical errors include barrel or pincushion distortions, longitudinal chromatic aberrations, or transverse chromatic aberrations. Other types of optical errors may further include spherical aberrations, chromatic aberrations or errors due to the lens field curvature, astigmatisms, in addition to other types of optical errors. In some embodiments, visual content transmitted to the display 825 is pre-distorted, and the optical assembly 830 corrects the distortion as image light from the display 825 passes through various optical elements of the optical assembly 830. In some embodiments, optical elements of the optical assembly 830 are integrated into the display 825 as a projection assembly that includes at least one waveguide coupled with one or more optical elements.

The IMU 840 is an electronic device that generates data indicating a position of the NED 805 based on measurement signals received from one or more of the position sensors 835 and from depth information received from the DCA 855. In some embodiments of the NED 805, the IMU 840 may be a dedicated hardware component. In other embodiments, the IMU 840 may be a software component implemented in one or more processors.

In operation, a position sensor 835 generates one or more measurement signals in response to a motion of the NED 805. Examples of position sensors 835 include: one or more accelerometers, one or more gyroscopes, one or more magnetometers, one or more altimeters, one or more inclinometers, and/or various types of sensors for motion detection, drift detection, and/or error detection. The position sensors 835 may be located external to the IMU 840, internal to the IMU 840, or some combination thereof.

Based on the one or more measurement signals from one or more position sensors 835, the IMU 840 generates data indicating an estimated current position of the NED 805 relative to an initial position of the NED 805. For example, the position sensors 835 include multiple accelerometers to measure translational motion (forward/back, up/down, left/right) and multiple gyroscopes to measure rotational motion (e.g., pitch, yaw, and roll). In some embodiments, the IMU 840 rapidly samples the measurement signals and calculates the estimated current position of the NED 805 from the sampled data. For example, the IMU 840 integrates the measurement signals received from the accelerometers over time to estimate a velocity vector and integrates the velocity vector over time to determine an estimated current position of a reference point on the NED 805. Alternatively, the IMU 840 provides the sampled measurement signals to the console 870, which analyzes the sample data to determine one or more measurement errors. The console 870 may further transmit one or more of control signals and/or measurement errors to the IMU 840 to configure the IMU 840 to correct and/or reduce one or more measurement errors (e.g., drift errors). The reference point is a point that may be used to describe the position of the NED 805. The reference point may generally be defined as a point in space or a position related to a position and/or orientation of the NED 805.

In various embodiments, the IMU 840 receives one or more parameters from the console 870. The one or more parameters are used to maintain tracking of the NED 805. Based on a received parameter, the IMU 840 may adjust one or more IMU parameters (e.g., a sample rate). In some embodiments, certain parameters cause the IMU 840 to update an initial position of the reference point so that it corresponds to a next position of the reference point. Updating the initial position of the reference point as the next calibrated position of the reference point helps reduce drift errors in detecting a current position estimate of the IMU 840.

In various embodiments, the eye tracking system 845 is integrated into the NED 805. The eye tracking system 845 may comprise one or more illumination sources (e.g., infrared illumination source, visible light illumination source) and one or more imaging devices (e.g., one or more cameras). In operation, the eye tracking system 845 generates and analyzes tracking data related to a user's eyes as the user wears the NED 805. In various embodiments, the eye tracking system 845 estimates the angular orientation of the user's eye. The orientation of the eye corresponds to the direction of the user's gaze within the NED 805. The orientation of the user's eye is defined herein as the direction of the foveal axis, which is the axis between the fovea (an area on the retina of the eye with the highest concentration of photoreceptors) and the center of the eye's pupil. In general, when a user's eyes are fixed on a point, the foveal axes of the user's eyes intersect that point. The pupillary axis is another axis of the eye that is defined as the axis passing through the center of the pupil and that is perpendicular to the corneal surface. The pupillary axis does not, in general, directly align with the foveal axis. Both axes intersect at the center of the pupil, but the orientation of the foveal axis is offset from the pupillary axis by approximately −1° to 8° laterally and ±4° vertically. Because the foveal axis is defined according to the fovea, which is located in the back of the eye, the foveal axis can be difficult or impossible to detect directly in some eye tracking embodiments. Accordingly, in some embodiments, the orientation of the pupillary axis is detected and the foveal axis is estimated based on the detected pupillary axis.

In general, movement of an eye corresponds not only to an angular rotation of the eye, but also to a translation of the eye, a change in the torsion of the eye, and/or a change in shape of the eye. The eye tracking system 845 may also detect translation of the eye, i.e., a change in the position of the eye relative to the eye socket. In some embodiments, the translation of the eye is not detected directly, but is approximated based on a mapping from a detected angular orientation. Translation of the eye corresponding to a change in the eye's position relative to the detection components of the eye tracking unit may also be detected. Translation of this type may occur, for example, due to a shift in the position of the NED 805 on a user's head. The eye tracking system 845 may also detect the torsion of the eye, i.e., rotation of the eye about the pupillary axis. The eye tracking system 845 may use the detected torsion of the eye to estimate the orientation of the foveal axis from the pupillary axis. The eye tracking system 845 may also track a change in the shape of the eye, which may be approximated as a skew or scaling linear transform or a twisting distortion (e.g., due to torsional deformation). The eye tracking system 845 may estimate the foveal axis based on some combination of the angular orientation of the pupillary axis, the translation of the eye, the torsion of the eye, and the current shape of the eye.

As the orientation may be determined for both eyes of the user, the eye tracking system 845 is able to determine where the user is looking. The NED 805 can use the orientation of the eye to, e.g., determine an inter-pupillary distance (IPD) of the user, determine gaze direction, introduce depth cues (e.g., blur image outside of the user's main line of sight), collect heuristics on the user interaction in the VR media (e.g., time spent on any particular subject, object, or frame as a function of exposed stimuli), some other function that is based in part on the orientation of at least one of the user's eyes, or some combination thereof. Determining a direction of a user's gaze may include determining a point of convergence based on the determined orientations of the user's left and right eyes. A point of convergence may be the point that the two foveal axes of the user's eyes intersect (or the nearest point between the two axes). The direction of the user's gaze may be the direction of a line through the point of convergence and through the point halfway between the pupils of the user's eyes.

In some embodiments, the varifocal module 850 is integrated into the NED 805. The varifocal module 850 may be communicatively coupled to the eye tracking system 845 in order to enable the varifocal module 850 to receive eye tracking information from the eye tracking system 845. The varifocal module 850 may further modify the focus of image light emitted from the display 825 based on the eye tracking information received from the eye tracking system 845. Accordingly, the varifocal module 850 can reduce vergence-accommodation conflict that may be produced as the user's eyes resolve the image light. In various embodiments, the varifocal module 850 can be interfaced (e.g., either mechanically or electrically) with at least one optical element of the optical assembly 830.

In operation, the varifocal module 850 may adjust the position and/or orientation of one or more optical elements in the optical assembly 830 in order to adjust the focus of image light propagating through the optical assembly 830. In various embodiments, the varifocal module 850 may use eye tracking information obtained from the eye tracking system 845 to determine how to adjust one or more optical elements in the optical assembly 830. In some embodiments, the varifocal module 850 may perform foveated rendering of the image light based on the eye tracking information obtained from the eye tracking system 845 in order to adjust the resolution of the image light emitted by the display 825. In this case, the varifocal module 850 configures the display 825 to display a high pixel density in a foveal region of the user's eye-gaze and a low pixel density in other regions of the user's eye-gaze.

The I/O interface 875 facilitates the transfer of action requests from a user to the console 870. In addition, the I/O interface 875 facilitates the transfer of device feedback from the console 870 to the user. An action request is a request to perform a particular action. For example, an action request may be an instruction to start or end capture of image or video data or an instruction to perform a particular action within an application, such as pausing video playback, increasing or decreasing the volume of audio playback, and so forth. In various embodiments, the I/O interface 875 may include one or more input devices. Example input devices include: a keyboard, a mouse, a game controller, a joystick, and/or any other suitable device for receiving action requests and communicating the action requests to the console 870. In some embodiments, the I/O interface 875 includes an IMU 840 that captures calibration data indicating an estimated current position of the I/O interface 875 relative to an initial position of the I/O interface 875.

In operation, the I/O interface 875 receives action requests from the user and transmits those action requests to the console 870. Responsive to receiving the action request, the console 870 performs a corresponding action. For example, responsive to receiving an action request, console 870 may configure I/O interface 875 to emit haptic feedback onto an arm of the user. For example, console 870 may configure I/O interface 875 to deliver haptic feedback to a user when an action request is received. Additionally or alternatively, the console 870 may configure the I/O interface 875 to generate haptic feedback when the console 870 performs an action, responsive to receiving an action request.

The console 870 provides content to the NED 805 for processing in accordance with information received from one or more of: the DCA 855, the eye tracking system 845, one or more other components of the NED 805, and the I/O interface 875. In the embodiment shown in FIG. 8, the console 870 includes an application store 860 and an engine 865. In some embodiments, the console 870 may have additional, fewer, or different modules and/or components than those described in conjunction with FIG. 8. Similarly, the functions further described below may be distributed among components of the console 870 in a different manner than described in conjunction with FIG. 8.

The application store 860 stores one or more applications for execution by the console 870. An application is a group of instructions that, when executed by a processor, performs a particular set of functions, such as generating content for presentation to the user. For example, an application may generate content in response to receiving inputs from a user (e.g., via movement of the NED 805 as the user moves his/her head, via the I/O interface 875, etc.). Examples of applications include: gaming applications, conferencing applications, video playback applications, or other suitable applications.

In some embodiments, the engine 865 generates a three-dimensional mapping of the area surrounding the NED 805 (i.e., the "local area") based on information received from the NED 805. In some embodiments, the engine 865 determines depth information for the three-dimensional mapping of the local area based on depth data received from the NED 805. In various embodiments, the engine 865 uses depth data received from the NED 805 to update a model of the local area and to generate and/or modify media content based in part on the updated model of the local area.

The engine 865 also executes applications within the NED system 800 and receives position information, acceleration information, velocity information, predicted future positions, or some combination thereof, of the NED 805. Based on the received information, the engine 865 determines various forms of media content to transmit to the NED 805 for presentation to the user. For example, if the received information indicates that the user has looked to the left, the engine 865 generates media content for the NED 805 that mirrors the user's movement in a virtual environment or in an environment augmenting the local area with additional media content. Accordingly, the engine 865 may generate and/or modify media content (e.g., visual and/or audio content) for presentation to the user. The engine 865 may further transmit the media content to the NED 805. Additionally, in response to receiving an action request from the I/O interface 875, the engine 865 may perform an action within an application executing on the console 870. The engine 865 may further provide feedback when the action is performed. For example, the engine 865 may configure the NED 805 to generate visual and/or audio feedback and/or the I/O interface 875 to generate haptic feedback to the user.

In some embodiments, based on the eye tracking information (e.g., orientation of the user's eye) received from the eye tracking system 845, the engine 865 determines a resolution of the media content provided to the NED 805 for presentation to the user on the display 825. The engine 865 may adjust a resolution of the visual content provided to the NED 805 by configuring the display 825 to perform foveated rendering of the visual content, based at least in part on a direction of the user's gaze received from the eye tracking system 845. The engine 865 provides the content to the NED 805 having a high resolution on the display 825 in a foveal region of the user's gaze and a low resolution in other regions, thereby reducing the power consumption of the NED 805. In addition, using foveated rendering reduces a number of computing cycles used in rendering visual content without compromising the quality of the user's visual experience. In some embodiments, the engine 865 can further use the eye tracking information to adjust a focus of the image light emitted from the display 825 in order to reduce vergence-accommodation conflicts.

Figure 9A:
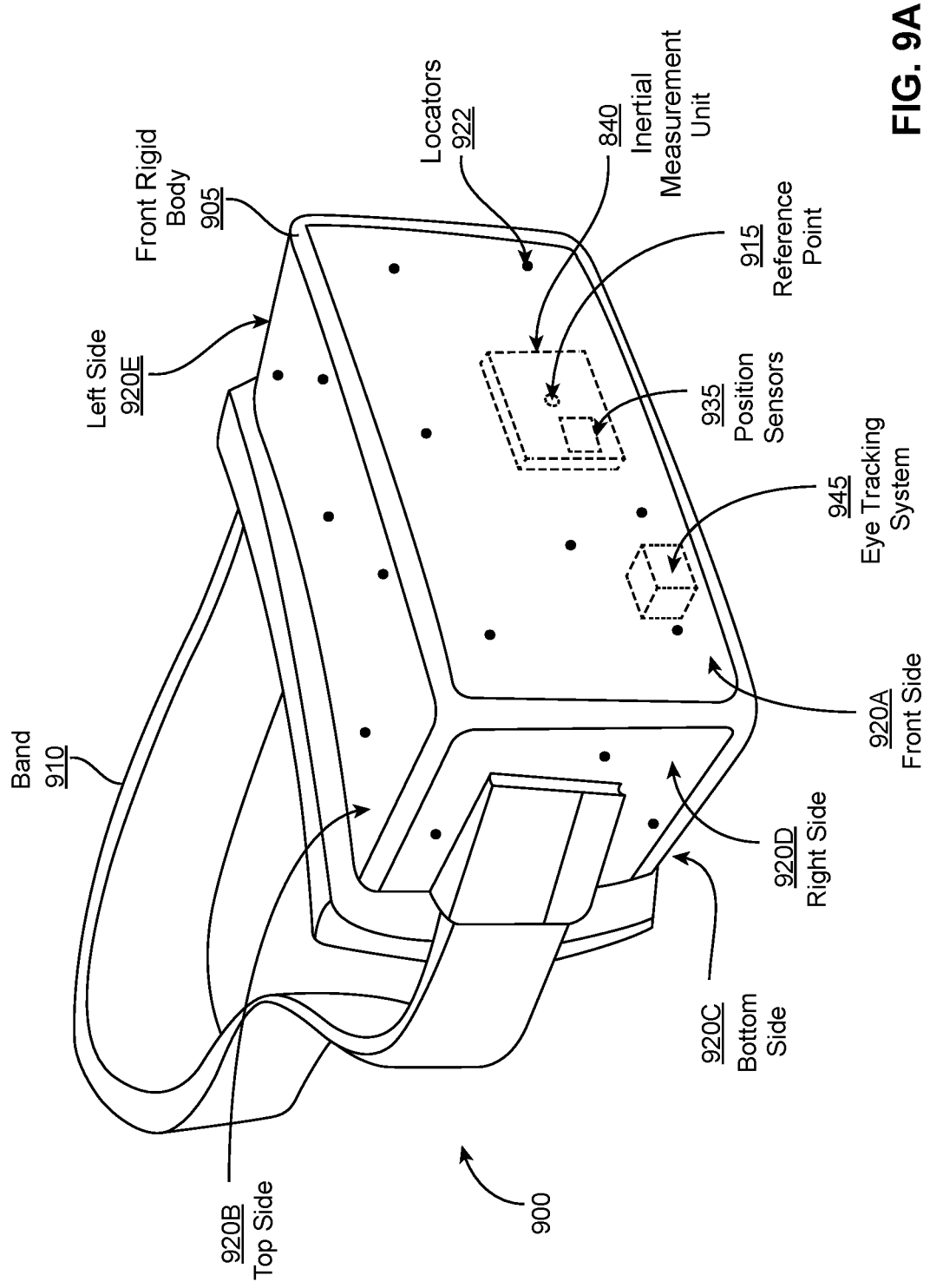
FIG. 9A is a diagram of an NED, according to various embodiments.

FIG. 9A is a diagram of an NED 900, according to various embodiments. In various embodiments, NED 900 presents media to a user. The media may include visual, auditory, and haptic content. In some embodiments, NED 900 provides artificial reality (e.g., virtual reality) content by providing a real-world environment and/or computer-generated content. In some embodiments, the computer-generated content may include visual, auditory, and haptic information. The NED 900 is an embodiment of the NED 805 and includes a front rigid body 905 and a band 910. The front rigid body 905 includes an electronic display element of the electronic display 825 (not shown in FIG. 9A), the optics assembly 830 (not shown in FIG. 9A), the IMU 840, the one or more position sensors 935, the eye tracking system 945, and the locators 922. In the embodiment shown by FIG. 9A, the position sensors 935 are located within the IMU 840, and neither the IMU 840 nor the position sensors 935 are visible to the user.

The locators 922 are located in fixed positions on the front rigid body 905 relative to one another and relative to a reference point 915. In the example of FIG. 9A, the reference point 915 is located at the center of the IMU 840. Each of the locators 922 emits light that is detectable by the imaging device in the DCA 855. The locators 922, or portions of the locators 922, are located on a front side 920A, a top side 920B, a bottom side 920C, a right side 920D, and a left side 920E of the front rigid body 905 in the example of FIG. 9A.

The NED 900 includes the eye tracking system 945. As discussed above, the eye tracking system 945 may include a structured light generator that projects an interferometric structured light pattern onto the user's eye and a camera to detect the illuminated portion of the eye. The structured light generator and the camera may be located off the axis of the user's gaze. In various embodiments, the eye tracking system 945 may include, additionally or alternatively, one or more time-of-flight sensors and/or one or more stereo depth sensors. In FIG. 9A, the eye tracking system 945 is located below the axis of the user's gaze, although the eye tracking system 945 can alternately be placed elsewhere. Also, in some embodiments, there is at least one eye tracking unit for the left eye of the user and at least one tracking unit for the right eye of the user.

In various embodiments, the eye tracking system 945 includes one or more cameras on the inside of the NED 900. The camera(s) of the eye tracking system 945 may be directed inwards, toward one or both eyes of the user while the user is wearing the NED 900, so that the camera(s) may image the eye(s) and eye region(s) of the user wearing the NED 900. The camera(s) may be located off the axis of the user's gaze. In some embodiments, the eye tracking system 945 includes separate cameras for the left eye and the right eye (e.g., one or more cameras directed toward the left eye of the user and, separately, one or more cameras directed toward the right eye of the user).

Figure 9B:
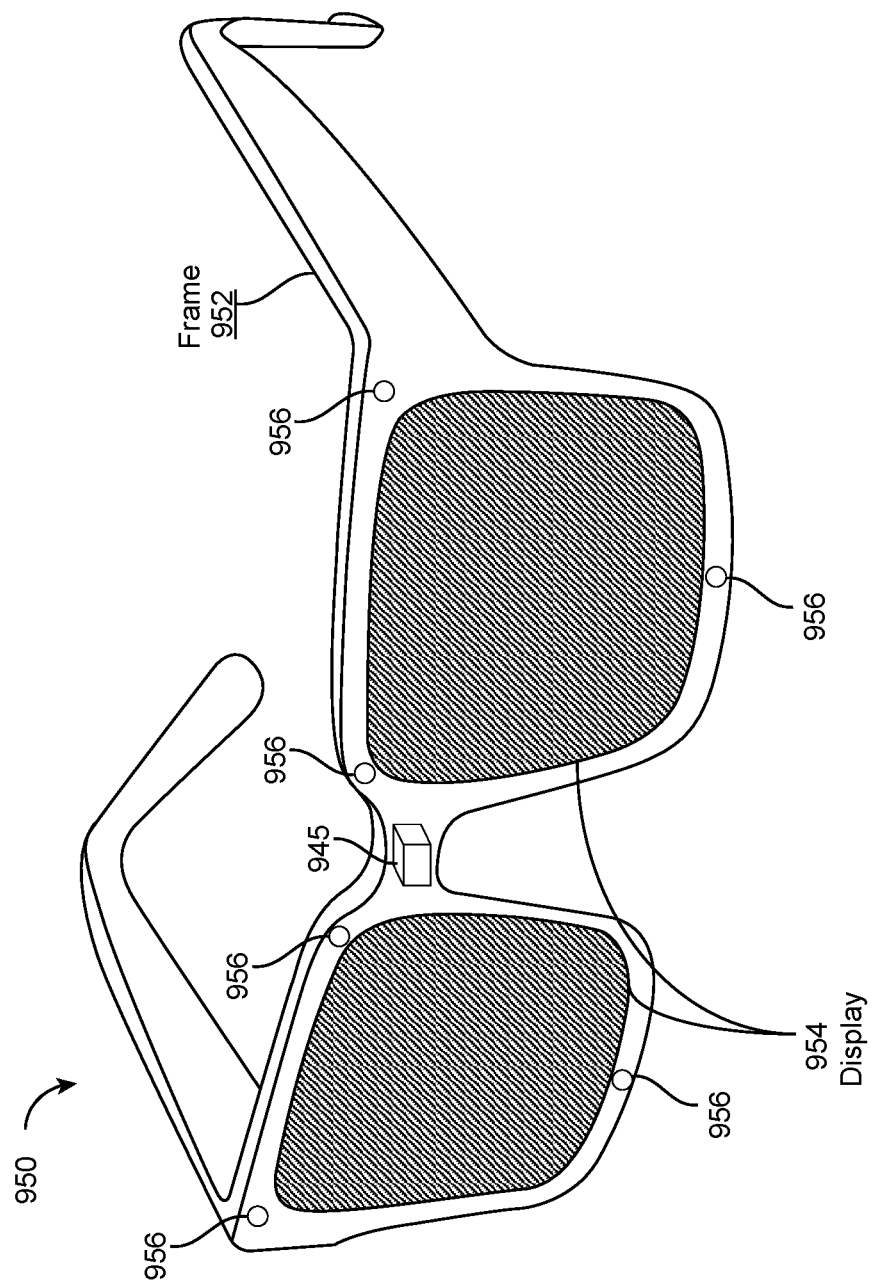
FIG. 9B is another diagram of an NED, according to various embodiments.

FIG. 9B is a diagram of an NED 950, according to various embodiments. In various embodiments, NED 950 presents media to a user. The media may include visual, auditory, and haptic content. In some embodiments, NED 950 provides artificial reality (e.g., augmented reality) content by providing a real-world environment and/or computer-generated content. In some embodiments, the computer-generated content may include visual, auditory, and haptic information. The NED 950 is an embodiment of the NED 805.

NED 950 includes frame 952 and display 954. In various embodiments, the NED 950 may include one or more additional elements. Display 954 may be positioned at different locations on the NED 950 than the locations illustrated in FIG. 9B. Display 954 is configured to provide content to the user, including audiovisual content. In some embodiments, one or more displays 954 may be located within frame 952.

NED 950 further includes eye tracking system 945 and one or more corresponding modules 956. The modules 956 may include emitters (e.g., light emitters) and/or sensors (e.g., image sensors, cameras). In various embodiments, the modules 956 are arranged at various positions along the inner surface of the frame 952, so that the modules 956 are facing the eyes of a user wearing the NED 950. For example, the modules 956 could include emitters that emit structured light patterns onto the eyes and image sensors to capture images of the structured light pattern on the eyes. As another example, the modules 956 could include multiple time-of-flight sensors for directing light at the eyes and measuring the time of travel of the light at each pixel of the sensors. As a further example, the modules 956 could include multiple stereo depth sensors for capturing images of the eyes from different vantage points. In various embodiments, the modules 956 also include image sensors for capturing 2D images of the eyes.

In sum, the disclosed techniques provide a photonic switch with a cantilever coupler that is electrostatically actuated. The cantilever coupler includes a lithium niobate material with a wide transmission window that allows for efficient transmission of light in both visible and communication wavelengths. Below the cantilever coupler, the photonic switch includes a lower layer formed from SiN, AlN, or another cladding material that transmits visible light. This lower layer includes two waveguides that direct light in two different directions. A first end of the cantilever coupler is positioned over a first waveguide in the lower layer without being bonded or physically attached to the first waveguide, and a second end of the cantilever coupler is bonded to a second waveguide in the lower layer.

During operation of the photonic switch, a set of electrodes is used to apply an electric potential across the first end of the cantilever coupler, thereby deforming the first end of the cantilever coupler downward toward the second waveguide in the lower layer. This deformation couples the first end of the cantilever coupler to the first waveguide in the lower layer and allows incoming light from the first waveguide to be routed to the second waveguide via one or more waveguides in the cantilever coupler. This application of electric potential across the first end of the cantilever coupler thus causes the photonic switch to be placed in an "on" state that propagates light from an input port coupled to the first waveguide to an output port coupled to the second waveguide. Conversely, a lack of electric potential across the first end of the cantilever coupler prevents the first end of the cantilever coupler from coupling with the first waveguide in the lower layer. The lack of electric potential across the first end of the cantilever coupler therefore causes the photonic switch to be placed in an "off" state that blocks the transmission of light from the input port coupled to the first waveguide to the output port coupled to the second waveguide.

One technical advantage of the disclosed techniques relative to the prior art is the use of a lithium niobate material with a wide transmission window to transmit light. Accordingly, the disclosed techniques can be used to transmit and route light in both visible and communication wavelengths, unlike conventional photonic switches that utilize silicon-based materials that are lossy in visible wavelengths. Another technical advantage of the disclosed techniques is the use of relatively simple structures to support the movable part of the photonic switch. Consequently, the disclosed techniques allow photonic switches to be fabricated more easily and efficiently than conventional approaches that involve complicated designs and fabrication methods. These technical advantages provide one or more technological improvements over prior art approaches.

1. In some embodiments, a photonic switch comprises a first layer comprising a first waveguide that directs light in a first direction and a second waveguide that directs light in a second direction that is different from the first direction; a cantilever coupler that is formed from a lithium niobate material and disposed over the first layer, wherein the cantilever coupler comprises a first end that is positioned over the first waveguide, wherein during application of an electric potential across the first end, the first end is deformed to couple to the first waveguide, and a second end that is bonded to the second waveguide; and a set of electrodes that apply the electric potential across the first end to propagate light between the first waveguide and the second waveguide.

2. The photonic switch of clause 1, wherein the light is not propagated between the first waveguide and the second waveguide when the first end is not deformed to couple to the first waveguide.

3. The photonic switch of any of clauses 1-2, further comprising a buried oxide layer disposed below the first layer.

4. The photonic switch of any of clauses 1-3, wherein the cantilever coupler further comprises a portion to which the set of electrodes is bonded; and a third waveguide that connects the first waveguide and the second waveguide.

5. The photonic switch of any of clauses 1-4, wherein the set of electrodes comprises two ground electrodes and two signal electrodes.

6. The photonic switch of any of clauses 1-5, wherein the cantilever coupler comprises a crystal orientation that increases a vertical deformation of the first end of the cantilever coupler.

7. The photonic switch of any of clauses 1-6, wherein the first waveguide is orthogonal to the second waveguide.

8. The photonic switch of any of clauses 1-7, wherein at least one of the first waveguide or the second waveguide are formed via etching of the first layer.

9. The photonic switch of any of clauses 1-8, wherein the first end and the second end are tapered.

10. The photonic switch of any of clauses 1-9, wherein the first layer comprises at least one of a silicon nitride material or an aluminum nitride material.

11. In some embodiments, a photonic integrated circuit comprises an input port; and a plurality of photonic switches coupled to the input port, wherein each photonic switch included in the plurality of photonic switches comprises a first layer comprising a first waveguide that directs light from the input port in a first direction and a second waveguide that directs the light in a second direction that is different from the first direction; a cantilever coupler that is formed from a lithium niobate material and disposed over the first layer, wherein the cantilever coupler comprises a first end that is positioned over the first waveguide, wherein during application of an electric potential across the first end, the first end is deformed to couple to the second waveguide, and a second end that is bonded to the second waveguide; and a set of electrodes that apply the electric potential across the first end to propagate light between the first waveguide and the second waveguide.

12. The photonic integrated circuit of clause 11, further comprising a plurality of output ports, wherein each photonic switch included in the plurality of photonic switches is coupled to a different output port included in the plurality of output ports.

13. The photonic integrated circuit of any of clauses 11-12, wherein the second waveguide in each photonic switch is coupled to the different output port included in the plurality of output ports.

14. The photonic integrated circuit of any of clauses 11-13, wherein each photonic switch included in the plurality of photonic switches further comprises a buried oxide layer disposed below the first layer.

15. The photonic integrated circuit of any of clauses 11-14, wherein the cantilever coupler further comprises a portion to which the set of electrodes is bonded; and a third waveguide that connects the first waveguide and the second waveguide.

16. The photonic integrated circuit of any of clauses 11-15, wherein the set of electrodes comprises two ground electrodes and two signal electrodes.

17. The photonic integrated circuit of any of clauses 11-16, wherein the cantilever coupler comprises a crystal orientation that increases a vertical deformation of the first end of the cantilever coupler.

18. The photonic integrated circuit of any of clauses 11-17, wherein during operation of the photonic integrated circuit, the electric potential is applied across the set of electrodes for a single photonic switch to propagate the light from the input port to a corresponding output port.

19. The photonic integrated circuit of any of clauses 11-18, wherein the first layer comprises a cladding material.

20. In some embodiments, a method for operating a photonic switch comprises applying an electric potential across a first end of a cantilever coupler that is formed from a lithium niobate material to couple the first end to a first waveguide, wherein coupling of the first end of the cantilever coupler to the first waveguide enables propagation of light between the first waveguide and a second waveguide through the cantilever coupler; and discontinuing application of the electric potential across the first end of the cantilever coupler to prevent coupling of the first end of the cantilever coupler to the first waveguide, wherein a lack of coupling of the first end of the cantilever coupler to the first waveguide blocks the propagation of light between the first waveguide and the second waveguide.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A photonic switch, comprising:
    a first layer comprising:
        a first waveguide that directs light in a first direction; and
        a second waveguide that directs light in a second direction that is different from the first direction;
    a cantilever coupler that is formed from a lithium niobate material and disposed over the first layer, wherein the cantilever coupler comprises:
        a first end that is positioned over the first waveguide, wherein during application of an electric potential across the first end, the first end is deformed to couple to the first waveguide; and
        a second end that is bonded to the second waveguide; and
    a set of electrodes that apply the electric potential across the first end to propagate light between the first waveguide and the second waveguide.

2. The photonic switch of claim 1, wherein the light is not propagated between the first waveguide and the second waveguide when the first end is not deformed to couple to the first waveguide.

3. The photonic switch of claim 1, further comprising a buried oxide layer disposed below the first layer.

4. The photonic switch of claim 1, wherein the cantilever coupler further comprises:
    a portion to which the set of electrodes is bonded; and
    a third waveguide that connects the first waveguide and the second waveguide.

5. The photonic switch of claim 1, wherein the set of electrodes comprises two ground electrodes and two signal electrodes.

6. The photonic switch of claim 1, wherein the cantilever coupler comprises a crystal orientation that increases a vertical deformation of the first end of the cantilever coupler.

7. The photonic switch of claim 1, wherein the first waveguide is orthogonal to the second waveguide.

8. The photonic switch of claim 1, wherein at least one of the first waveguide or the second waveguide are formed via etching of the first layer.

9. The photonic switch of claim 1, wherein the first end and the second end are tapered.

10. The photonic switch of claim 1, wherein the first layer comprises at least one of a silicon nitride material or an aluminum nitride material.

11. A photonic integrated circuit, comprising:
    an input port; and
    a plurality of photonic switches coupled to the input port, wherein each photonic switch included in the plurality of photonic switches comprises:
        a first layer comprising:
            a first waveguide that directs light from the input port in a first direction; and
            a second waveguide that directs the light in a second direction that is different from the first direction;
        a cantilever coupler that is formed from a lithium niobate material and disposed over the first layer, wherein the cantilever coupler comprises:
            a first end that is positioned over the first waveguide, wherein during application of an electric potential across the first end, the first end is deformed to couple to the second waveguide; and
            a second end that is bonded to the second waveguide; and
        a set of electrodes that apply the electric potential across the first end to propagate light between the first waveguide and the second waveguide.

12. The photonic integrated circuit of claim 11, further comprising a plurality of output ports, wherein each photonic switch included in the plurality of photonic switches is coupled to a different output port included in the plurality of output ports.

13. The photonic integrated circuit of claim 12, wherein the second waveguide in each photonic switch is coupled to the different output port included in the plurality of output ports.

14. The photonic integrated circuit of claim 11, wherein each photonic switch included in the plurality of photonic switches further comprises a buried oxide layer disposed below the first layer.

15. The photonic integrated circuit of claim 11, wherein the cantilever coupler further comprises:
    a portion to which the set of electrodes is bonded; and
    a third waveguide that connects the first waveguide and the second waveguide.

16. The photonic integrated circuit of claim 11, wherein the set of electrodes comprises two ground electrodes and two signal electrodes.

17. The photonic integrated circuit of claim 11, wherein the cantilever coupler comprises a crystal orientation that increases a vertical deformation of the first end of the cantilever coupler.

18. The photonic integrated circuit of claim 11, wherein during operation of the photonic integrated circuit, the electric potential is applied across the set of electrodes for a single photonic switch to propagate the light from the input port to a corresponding output port.

19. The photonic integrated circuit of claim 11, wherein the first layer comprises a cladding material.

20. A method for operating a photonic switch, comprising:
applying an electric potential across a first end of a cantilever coupler that is formed from a lithium niobate material to couple the first end to a first waveguide, wherein coupling of the first end of the cantilever coupler to the first waveguide enables propagation of light between the first waveguide and a second waveguide through the cantilever coupler; and
discontinuing application of the electric potential across the first end of the cantilever coupler to prevent coupling of the first end of the cantilever coupler to the first waveguide, wherein a lack of coupling of the first end of the cantilever coupler to the first waveguide blocks the propagation of light between the first waveguide and the second waveguide.

* * * * *